United States Patent [19]
Sprayberry et al.

[11] Patent Number: 6,060,140
[45] Date of Patent: May 9, 2000

[54] LIGHTWEIGHT BOTTLES AND METHOD FOR MAKING SAME

[75] Inventors: Harold Blake Sprayberry, Kingsport, Tenn.; Vincent Veret, Etouy, France

[73] Assignee: Eastman Chemical Company, Kingsport, Tenn.

[21] Appl. No.: 09/062,135

[22] Filed: Apr. 17, 1998

Related U.S. Application Data

[60] Provisional application No. 60/044,919, Apr. 25, 1997.

[51] Int. Cl.[7] .......................... B29D 22/00; C08G 63/16; B27N 3/08

[52] U.S. Cl. .................... 428/36.9; 264/239; 264/299; 264/259; 264/291; 264/464; 264/479; 264/DIG. 4; 264/DIG. 64; 428/35.7; 428/36.92; 528/298; 528/302; 528/308; 528/308.6

[58] Field of Search .................... 264/464, 479, 264/239, 299, 259, 291, DIG. 4, DIG. 64; 428/35.7, 36.9, 36.92; 528/298, 302, 308, 308.6

[56] References Cited

U.S. PATENT DOCUMENTS

| | | |
|---|---|---|
| 4,496,064 | 1/1985 | Beck et al. . |
| 4,579,936 | 4/1986 | O'Neill . |
| 5,281,387 | 1/1994 | Collette et al. . |
| 5,520,877 | 5/1996 | Collette et al. .......................... 264/521 |

FOREIGN PATENT DOCUMENTS

| | | |
|---|---|---|
| WO 94/09353 | 4/1994 | WIPO . |
| WO 96/33062 | 10/1996 | WIPO . |

*Primary Examiner*—Samuel A. Acquah
*Attorney, Agent, or Firm*—Karen A. Harding; Harry J. Gwinnell

[57] ABSTRACT

The present invention discloses a process comprising forming a preform with planar stretch ratios greater than about 14 from a polyester having a natural stretch ratio which is substantially matched to the preform planar stretch ratio at processing conditions; and stretch blow molding said preform to produce a container. Suitable natural stretch ratios include those greater than about 13 at 210° F. The desired natural stretch ratios and desirable final container properties are achieved by balancing the appropriate I.V. and copolymer modification.

29 Claims, No Drawings

LIGHTWEIGHT BOTTLES AND METHOD FOR MAKING SAME

RELATED APPLICATIONS

This application claims the benefit of provisional application U.S. Ser. No. 60/044,919 filed Apr. 25, 1997

FIELD OF THE INVENTION

The present invention relates to polyester compositions suitable for making highly stretched and lighter weight stretch blow molded containers. A process for making lighter weight containers is also disclosed. The polyesters of the present invention display superior stretching characteristics (higher natural stretch ratio, increased freeblow volume, etc), which permit (or increase the processing window for) the production of light weight, highly stretched (mechanically oriented) PET bottles using stretch blow molding (SBM) equipment or SBM equipment technology. The bottles of the present invention display increased preform to bottle stretch ratio, which reduces total bottle weight.

BACKGROUND OF THE INVENTION

Standard PET bottle polymer typically has an intrinsic viscosity, or IV in the range of 0.76 to 0.84 dl/g. Copolymer modification (acid or glycol) has been used to decrease the crystallization rate and widen the injection molding processing window. Standard PET bottle polymers with copolymer modification typically have higher IV in order to compensate for the increase in natural stretch ratio associated with the copolymer modification; and to compensate for the expected drop in bottle physical properties such as topload, structural strength, creep resistance, etc associated with copolymer modification.

Processing equipment and technology have been developed to reduce bottle weight by increasing the preform to bottle stretch ratio, or highly stretching the preforms. In standard bottle designs, higher IV has been associated with improved bottle physical properties because of the generally better orientation at standard planar stretch ratios. It seemed natural that a higher IV would be desirable in the lighter bottles using higher planar stretch ratios, and that increasing polymer IV would result in better physical properties. Thus, container molders have specified that PET with IV values between about 0.80 to about 0.84 dl/g be used for the highly stretched, lighter weight bottles. Since bottle weight reduction was the result of increasing the planar stretch ratio from the standard 11–13 to approximately 14–15.5, and the standard PET bottle polymer had been designed to process at the lower stretch ratios; many problems were encountered with the new designs. This has resulted in extremely difficult, often impossible processing because the preforms made from PET polymer with the recommended IV could not stretch to the designed planar stretch ratio and achieve proper material distribution and clarity; regardless of the processing changes made. In other cases; the processing window using the new designs was prohibitively narrow; and bottle properties were not consistent.

DESCRIPTION OF THE INVENTION

The present invention relates to an improved polyester composition displaying improved stretching characteristics. Such polyesters comprise an IV of less than about 0.75 dl/g, up to about 20 mol % copolymer modification and natural stretch ratios greater than about 14 and preferably between about 14 and about 15.5.

The present invention further relates to a process comprising forming a preform with planar stretch ratios greater than about 14 and preferably from about 14 to about 15.5 from a polyester having a natural stretch ratio which is substantially matched to the preform planar stretch ratio at processing conditions; and stretch blow molding said preform to produce a bottle. By substantilly matched we mean a natural stretch ratio which is within 10% of the planar stretch ratio.

Containers of the present invention also display improved material distribution throughout the bottle. Low variability in the thickness of the bottle walls and sections is critical in light weight bottles. Because there is less polymer used in a light weight bottle the polymer must be evenly distributed. If it is not, the thin sections will be prone to failure greatly increasing column and top load strength. The improved material distribution also leads to significantly improve processes because less molding condition optimization is required to produce bottles having good strength. Suprisingly, the containers of the present invention display surprisingly good physical properties such as topload strength which are as good and in some cases better than conventional weight bottles.

The compositions of the present invention generally possess an IV of less than about 0.75, preferably about 0.65 to about 0.75 (lower that conventional PET bottle polymer) and more preferably between about 0.65 and 0.75 and optionally moderate copolymer modification. Generally IV is measured at 25° C. at a concentration of 0.5 g/dL in a 60:40 phenol-:trichloroethane cosolvent. Higher I.V. polymers may also be used for highly modified compolymers which comprise greater than about 5 mole % comonomer content and preferably greater than about 7 mole % comonomer content. It should be appreciated that the maximum useful I.V. will increase with increasing comonomer modification.

Any polyester composition which is suitable for making a bottle may be utilized. Examples of suitable polyesters include poly(ethylene terephthalate), poly(ethylene naphthalenedicarboxylate), and copolyesters thereof containing up to about 50 mol % of modifying dibasic acids and/or glycols, and more preferably up to about 20% and most preferably up to about 10 mol %. Modifying dibasic acids may contain from about 2 to about 40 carbons atoms, and preferably include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of dicarboxylic acids to be included with terephthalic acid are: phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like. Examples of dicarboxylic acids to be included with naphthalenedicarboxylic acid are: terephthalic acid, phthalic acid, isophthalic acid, other isomers of naphthalenedicarboxylic acid, cyclohexanedicarboxylic acid, cyclohexanediacetic acid, diphenyl-4, 4'-dicarboxylic acid, succinic acid, glutaric acid, adipic acid, azelaic acid, sebacic acid, and the like. Polyesters may be prepared from two or more of the above dicarboxylic acids.

Modifying glycol components include, but are not limited to cycloaliphatic diols preferably having 6 to 20 carbon atoms or aliphatic diols preferably having 3 to 20 carbon atoms and aromatic diols, preferably having 6 to 14 carbon atoms. Examples of such diols to be included with ethylene glycol are: diethylene glycol, triethylene glycol, 1,4-cyclohexanedimethanol (cis, trans or as cisitrans mixtures), propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, and 2,2-bis-(4-hydroxypropoxyphenyl)-propane. Polyesters may be prepared from two or more of the above diols.

The resin may also contain small amounts of trifunctional or tetrafunctional comonomers such as trimellitic anhydride, trimethylolpropane, pyromellitic dianhydride, pentaerythritol, and other polyester forming polyacids or polyols generally known in the art.

Highly useful naphthalenedicarboxylic acids include the 2,6-, 1,4-, 1,5-, or 2,7-isomers but the 1,2-. 1.3-, 1,6-, 1,7-, 1,8-, 2,3-, 2,4-, 2,5-, and/or 2,8-isomers may also be used.

The dibasic acids may be used in acid form or as their esters such as the dimethyl esters for example.

The polyesters of this invention are readily prepared using polycondensation reaction conditions well known in the art. Typical polyesterification catalysts which may be used include titanium alkoxides, dibutyl tin dilaurate, and antimony oxide or antimony triacetate, used separately or in combination, optionally with zinc, manganese, or magnesium acetates or benzoates and/or other such catalyst materials as are well known to those skilled in the art. Phosphorus and cobalt compounds may also optionally be present. Although we prefer to use continuous polycondensation reactors, batch reactors operated in series may also be used.

Other components such as nucleating agents, branching agents, colorants, pigments, fillers, antioxidants, ultraviolet light and heat stabilizers, impact modifiers and the like may be used if desired.

In producing the polyesters of the present invention they could be made entirely in the melt, or prepolymer with an IV of about 0.5 to about 0.65 dL/g could be generated in the melt and then solid stated to increase the IV to the desired level. Conditions for solid stating are well known in the art and need not be described in detail here.

The compositions of the present invention provide polyesters having increased stretch ratios and acceptable processing performance. It should be understood that the desired natural stretch ratios can be achieved by any combination of IV and modification, such as, but not limited to higher IV and copolymer modification or lower IV and low or no copolymer modification.

Polyesters of the present invention can be readily stretch blow molded into lightweight, highly stretched PET bottles with enhanced physical properties and improved processability. Generally preforms and containers of the present invention weigh less than about 30 gm and preferably between about 25 gm and 30 gm for a 1.5 l container. Thus, in one embodiment of the present invention (where lighter bottles are desired) containers of the present invention weigh up to about 25% less than presently produced containers. Thus the containers of the present invention display excellent physical properties at reduced weights; which more than compensate for the decrease in IV from the recommended range. It was totally unexpected that the containers of the present invention would display top load strengths which are at least as good as those for heavier containers made from higher I.V. polymer.

Containers of the present invention are produced using a stretch blow molding process. Stretch blow molding is accomplished in two distinct steps; first, the polyester is melted in an extruder and injected into a mold forming a preform or parison; second, the preform is then blown into the final container shape. The actual blowing of the preform must occur at a temperature slightly above the glass transition temperature of the polyester. In a "single stage" SBM process the preform is transferred from the injection mold directly to a blow molding station. During the transfer time, the preform cools to the proper blow molding temperature. In a "two stage" SBM process the preform is ejected from the injection mold and then held at ambient temperatures for a time long enough to achieve a consistent temperature within the lot of preforms. In a separate step the preforms are reheated to the proper blow molding temperature before being blown into the desired container shape. The specific type of process used is determined by the volume of production, or the production rate desired for a specific application; and the machine design and capabilities.

Because of the improved material distribution displayed by the S containers of the present invention, the blow molding temperature can be decreased by up to about 10° C., and preferably between about 5 and about 10° C. in comparision to the molding temperature required for a conventional (low compolymer modification, high I.V.) polymer. This decrease in temperature provides containers which display lower acetaldehyde levels and improved color over containers made from conventional processes and with conventional polymers.

It is well known that polyesters exhibit a dramatic improvement in physical properties when mechanically stretched, or oriented. During the SBM process, this mechanical stretching occurs when the preform is blow molded into the final container shape. Preform design and SBM processing conditions are used to impart the desired level of mechanical stretching (stretch ratio) to the bottle sidewalls and base; and thus determine many of the container physical properties. Planar stretch ratios ranging from approximately 11 to 13 are commonly used in polyester containers that require excellent physical properties, and are considered standard practice in the industry. The process of the present invention utilizes planar stretch ratios of at least about 13 and preferably from about 14 to about 15.5.

The present invention allows the amount of polyester which is required to form an acceptable container to be significantly reduced. Container manufacturers and equipment suppliers are developing methods and equipment for highly stretching preforms, but could not find a suitable polyester. Unfortunately, many container performance characteristics were adversely affected when conventional polyester was used in to form lighter weight containers with thinner sidewalls and bases. Changes in the SBM process and equipment did not totally counteract these adverse affects. Efforts to use higher IV polyester produced hazy bottles with unacceptably narrow processing windows.

It was quite surprising to find that highly oriented, lighter weight bottles having good physical properties could be produced by utilizing the lower IV/optionally modified polyesters of the present invention. It was further surprising that the compositions of the present invention would display desirable processing windows or processing flexibility which is marked by the lower blow molding temperatures and improved material distribution.

The process of the present invention comprises forming a preform with planar stretch ratios from about 14 to about 15.5 from a polyester having a natural stretch ratio which is substantially matched to the preform planar stretch ratio at the processing conditions; and stretch blow molding said preform to produce a container.

Containers which are lightweight and have surprisingly good physical properties are also disclosed. Accordingly, the present invention further relates to containers which are formed from polyester having a natural stretch ratio of at least about 13 at about 210° F. Containers of the present invention also weigh 20% less than conventional containers of the same size and configuration. The containers of the present invention surprisingly retained good physical properties such as topload strength despite their lighter weights and the lower I.V. polymers which were used. Top load strengths of at least about 6 kg. and about 70 kg (empty and full respectively) at 108° C. were achieved.

The efforts to lightweight by using specially designed preforms for highly stretched bottles have been hampered by the stretching characteristics of standard PET formulas and their effect on processing. The PET preform can be said to have a "natural stretch ratio", or NSR; at which point the PET begins to self level. Stretching beyond the NSR imparts improved physical properties, but too much stretching causes a loss of clarity and delaminating (typically called pearlesence, or pearl point). Thus in SBM processes it is critical that degree of stretching does not significantly exceed the NSR of the selected polyester

EXAMPLE 1

Two resins having the same composition, but different IV were injection molded into a specially designed (15.26 planar stretch ratio) preform and stretch blow molded into a 1-liter, 22 gram bottle design (light weight, highly stretched). The SBM equipment was a Sidel SBO 4/6 running at 1200 bottles/hr/mold.

Resin A—0.72 IV, PET modified with 1.5% CHDM (Eastapak 18696, from Eastman Chemical Company).

Resin B—0.80 IV, PET modified with 1.5% CHDM (Eastapak 9921W from Eastman Chemical Company). The topload (force from above at which bottle deflects) was measured for bottles made from Resins A and B and is shown in Table 1, below

TABLE 1

|  | Topload (empty) | Topload (filled) | Vaccum Test |
|---|---|---|---|
| Resin A | 7.1 kg | 43.5 kg | 74.4 mm/Hg |
| Resin B | 6.2 kg | 40.6 kg | 64.8 mm/Hg |

Surprisingly Resin A displayed greater topload strength even though the Resin A has a lower IV. Topload strength is a general measure of a bottles ability to withstand force applied from above. Such forces are common during filling and storage and shipping of the filled bottles (which are generally stacked several layers high).

The processing for Resin A was also much easier and acceptable bottles were produced at a relatively wide range of conditions. The processing of Resin B was very difficult, and bottles exhibited an unacceptable amount of whiteness (pearl) around parts of the sidewall and base. The stretching characteristics of both resins are shown in Table 2, below in order to illustrate the difference between a standard PET Bottle Polymer and the polyesters of the present invention which display higher natural stretch ratio.

TABLE 2

|  | NSR (planar) at 200° F. | NSR (planar) at 210° F. |
|---|---|---|
| Resin A | 13.8 | 15.3 |
| Resin B | 11.5 | 12.1 |

Conventional thinking in the bottle art is that lowering the IV would decrease the processing window and lower resultant physical properties. Thus, it was very surprising to find that both processing and resulting physical properties improved when the lower IV materials of the present invention were used to form a highly stretched, light weight container.

EXAMPLE 2

Resins A and B were molded into 21.8 g preforms and then stretch blow molded into 1 l containers using Sidel SB 6/10 molding machine at two preform molding temperatures (113 and 108° C.) using the following settings.

TABLE 3

Blow Molding Conditions for High PSR Preform Trial at Sidel

|  | 9921W | 18696 |
|---|---|---|
| Date | 6-Feb-98 | 6-Feb-98 |
| Machine | Sidel SBO-6/10 | Sidel SBO-6/10 |
| Number Active Molds | 1 | 1 |
| Nominal Production Rate (bottles/hr) | 7200 | 7200 |
| Production Rate per mold (bottles/hr) | 1200 | 1200 |
| Overall Oven Heating % | 89 | 86 |
| Zone 8 % | 0 | 0 |
| Zone 7 % | 60 | 60 |
| Zone 6 % | 60 | 60 |
| Zone 5 % | 100 | 100 |
| Zone 4 % | 100 | 100 |
| Zone 3 % | 100 | 100 |
| Zone 2 % | 40 | 40 |
| Zone 1 % | 95 | 95 |

The Top Load for the containers is shown in Table 4, below.

TABLE 4

| Resin | Top load empty in kg (100 mm/min) | Top load full in kg (100 mm/min) | pellet I.V. (dl/g) |
|---|---|---|---|
| Resin A (112° C.) | 5.8 | 81.6 | 0.73 |
| Resin B (113° C.) | 6.2 | 71.9 | 0.81 |
| Resin A (108° C.)* | 6.4 | 74.2 | 0.73 |
| Resin B (108° C.) | 6.8 | 68.1 | 0.81 |

The examples designated with an "*" note the optimized blow molding conditions for each polymer. Thus, for Resin A, 108° C. was the "optimized" molding temperature and for Resin B 113° C. was the "optimized molding temperature. Surprisingly, Resin A formed a container which displayed equivalent mechanical properties (equivalent Top load (empty) and slightly improved Top load (full)), even though it has a significantly lower I.V. The present Examples also demonstrate the lower molding temperatures which are required by the process of the present invention. As in Example 1, it was very surprising to find that Resin A had a higher Top Load. The surprisingly good top load indicates exceptional material distribution in the container, even at lower processing temperatures.

We claim:

1. A process comprising forming a preform with a planar stretch ratio greater than about 14 from a polyester having a natural stretch ratio which is substantially matched to the preform planar stretch ratio at processing conditions;

and stretch blow molding said preform at said planar stretch ratio to produce a lightweight container.

2. The process of claim 1 wherein said planar stretch ratio is between about 14 and about 15.5.

3. The process of claim 1 wherein said natural stretch ratio is at least about 13 at 210° F.

4. The process of claim 1 wherein said polyester comprises an IV of less than about 0.75 dl/g.

5. The process of claim 1 wherein said polyester comprises an IV of between about 0.65 and about 0.75 dl/g.

6. The process of claim 1 wherein said polyester comprises repeat units derived from at least one dicarboxylic acid and at least one glycol.

7. The process of claim 6 wherein said dicarboxylic acid comprises terephthalic acid, 2,6-naphthalenedicarboxylic acid and mixtures thereof.

8. The process of claim 7 wherein said dicarboxylic acid further comprises up to about 50 mol % of at least one modifying dibasic acid selected from the group consisting of aromatic dicarboxylic acids having 8 to 14 carbon atoms, aliphatic dicarboxylic acids having 4 to 12 carbon atoms, or cycloaliphatic dicarboxylic acids having 8 to 12 carbon atoms.

9. The process of claim 7 wherein said dicarboxylic acid further comprises up to about 20 mol % of at least one modifying dibasic acid.

10. The process of claim 7 wherein said dicarboxylic acid further comprises up to about 10 mol % of at least one modifying dibasic acid.

11. The process of claim 8 wherein said modifying dibasic acid is selected from the group consisting of phthalic acid, isophthalic acid, other isomers of naphthalenedicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid and mixtures thereof.

12. The process of claim 1 wherein said glycol comprises ethylene glycol.

13. The process of claim 10 wherein said glycol further comprises at least one modifying glycol selected from the group consisting of cycloaliphatic diols having 6 to 20 carbon atoms, aliphatic diols having 3 to 20 carbon atoms, aromatic diols having 6 to 14 carbon atoms and mixtures thereof.

14. The process of claim 13 wherein said at least one modifying glycol is selected from the group consisting of diethylene glycol, triethylene glycol, 1,4-cyclohexanedimethanol (cis, trans or as cis/trans mixtures), propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, 2,2-bis-(4-hydroxypropoxyphenyl)-propane and the like and mixtures thereof.

15. The process of claim 1 wherein said stretch blow molding is conducted at a temperature which is up to about 10° C. lower than blow molding temperature for a conventional polymer.

16. A lightweight container comprising a polyester having a natural stretch ratio of at least about 13 at 210° F.

17. The container of claim 16 wherein said polyester comprises an IV of less than about 0.75.

18. The container of claim 16 wherein said polyester comprises an IV of between about 0.65 to about 0.75.

19. The container of claim 16 wherein said polyester comprises an IV of greater than about 0.75 and greater than about 5 mole % of at least one comonomer.

20. The container of claim 16 wherein said polyester comprises repeat units derived from at least one dicarboxylic acid and at least one glycol.

21. The container of claim 20 wherein said dicarboxylic acid comprises terephthalic acid, 2,6-naphthalenedicarboxylic acid and mixtures thereof.

22. The container of claim 21 wherein said dicarboxylic acid further comprises up to about 50 mol % of at least one modifying dibasic acid selected from the group consisting of aromatic dicarboxylic acids having 8 to 14 carbon atoms, aliphatic dicarboxylic acids having 4 to 12 carbon atoms, or cycloaliphatic dicarboxylic acids having 8 to 12 carbon atoms.

23. The container of claim 16 wherein said dicarboxylic acid comprises up to about 20 mol % of at least one modifying dibasic acid.

24. The container of claim 16 wherein said modifying dibasic acid is selected from the group consisting of phthalic acid, isophthalic acid, other isomers of naphthalenedicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid and the like and mixtures thereof.

25. The container of claim 16 wherein said glycol comprises ethylene glycol.

26. The container of claim 25 wherein said glycol further comprises at least one modifying glycol selected from the group consisting of cycloaliphatic diols having 6 to 20 carbon atoms, aliphatic diols having 3 to 20 carbon atoms, aromatic diols having 6 to 14 carbon atoms and mixtures thereof.

27. The process of claim 26 wherein said at least one modifying glycol is selected from the group consisting of diethylene glycol, triethylene glycol, 1,4-cyclohexanedimethanol (cis, trans or as cis/trans mixtures), propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, 2,2-bis-(4-hydroxypropoxyphenyl)-propane and the like and mixtures thereof.

28. A process comprising forming a preform with a planar stretch ratio greater than about 14 from a polyester having an I.V. of less than about 0.75 dL/g and a natural stretch ratio which is substantially matched to the preform planar stretch ratio at processing conditions;

and stretch blow molding said preform at said planar stretch to produce a container.

29. A process comprising forming a preform with a planar stretch ratio of about 14 to about 15.5 from a polyester having a natural stretch ratio which is substantially matched to the preform planar stretch ratio at processing conditions;

and stretch blow molding said preform at said planar stretch ratio to produce a container.

* * * * *

UNITED STATES PATENT AND TRADEMARK OFFICE
CERTIFICATE OF CORRECTION

PATENT NO. : 6,060,140
DATED : May 9, 2000
INVENTOR(S) : Harold Blake Sprayberry, Vincent Veret It is certified that error appears in the above-identified patent and that said Letters Patent is hereby corrected as shown below:

Column 7, Claim 14 (lines 12 and 13), "and the like" should be deleted

Signed and Sealed this

Sixth Day of March, 2001

Attest:

Attesting Officer

NICHOLAS P. GODICI

Acting Director of the United States Patent and Trademark Office